Feb. 14, 1956  H. W. DAVIDSON  2,734,694
TROTLINE REEL

Filed May 28, 1953  2 Sheets-Sheet 1

Harley W. Davidson
INVENTOR.

Feb. 14, 1956  H. W. DAVIDSON  2,734,694
TROTLINE REEL
Filed May 28, 1953 2 Sheets-Sheet 2
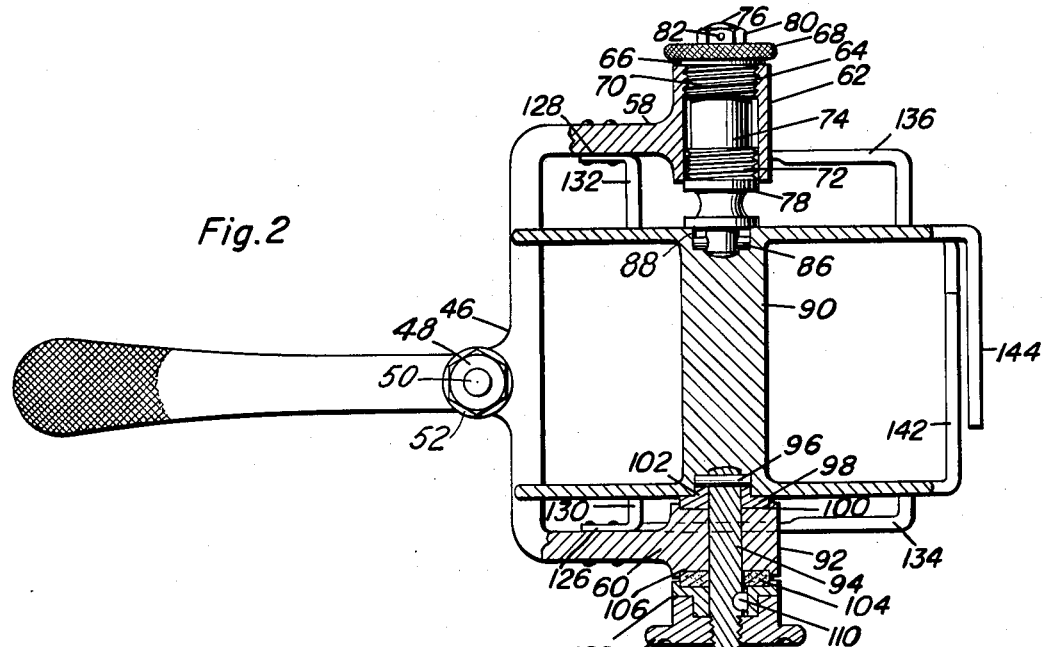
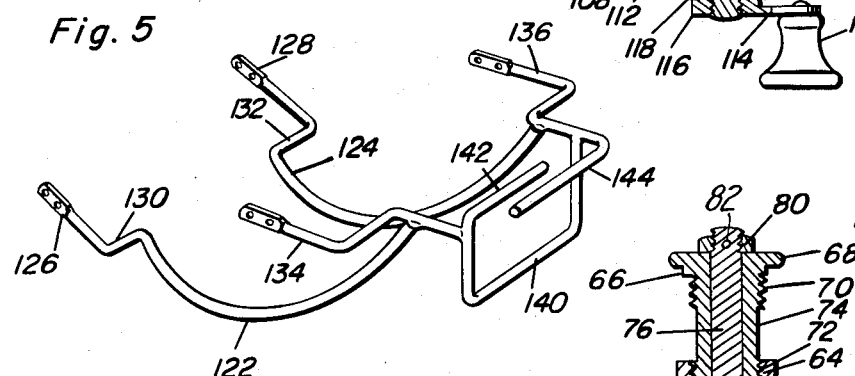
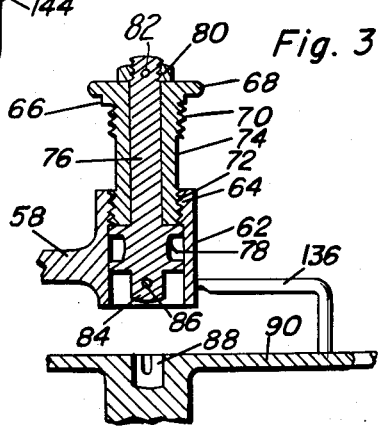
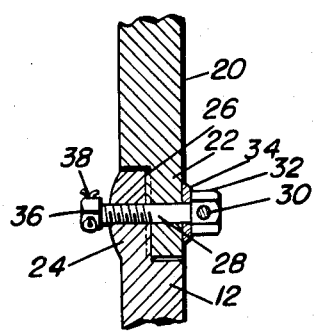
Harley W. Davidson
INVENTOR.

United States Patent Office 2,734,694
Patented Feb. 14, 1956

2,734,694

TROTLINE REEL

Harley W. Davidson, Malvern, Ark.

Application May 28, 1953, Serial No. 357,945

3 Claims. (Cl. 242—106)

This invention relates to a trotline reel and particularly to a reel in which the spools may be removed and the line disengaged from the line guide so that any portion of the line may be used without the necessity of severing the line to release it from the reel.

In the utilization of trotlines for fishing in various fresh water it is frequently desirable to use so-called trotlines for substantially unattended lines to fish over long periods of time. These lines of considerable length sometimes of as much as a thousand feet are usually anchored firmly at each end and are provided with so-called trots detachably secured at desirable distances along the line. These trots are usually of eighteen to twenty-four inches in length and carry a fishhook which may be baited with any suitable material.

In establishing trotlines it is customary to firmly anchor one end of the line and then pay out the line while maintaining it under substantial tension until the desired length of line is laid and then the second end is firmly fastened. The fisherman will then lift the line and apply the trots as desired. In taking up the trotline the trots are removed while the ends of the line are anchored after which one end is loosened and the line retrieved.

In taking up and putting down trotlines considerable difficulty is encountered because of the tendency of the lines to become entangled with various portions of the boat which is used to put out the line. Heretofore it has been customary to provide various types of hand supported reels or to wind the trotlines onto a board or stick or even to deposit the line in coils on the bottom of the boat. When paying out the line it has a tendency to become entangled not only with the portions of the boat but even with the fisherman himself so that his life may be endangered. Heretofore, when the line became entangled, it has been necessary to stop and anchor the boat and spend considerable time in straightening the line before it could again be payed out. The motion of the boat during the anchoring period frequently provides slack in the trotline which allows it to become ensnarled with rocks, snags or other impediments on the bottom of the water.

The present invention provides a reel adapted to carry a spool on which the trotlines may be firmly wound and a guide to place the line in firm position so that it will be easily wound. The reel is mounted on a stand and is swivelly mounted thereon so that the reel may be moved back and forth to produce a level winding action of the trotline as it is wound onto the spools. The line guide or bridle is provided with a labyrinth type joint in the portion thereof so that the line may be disengaged from the guide or bridle without the necessity of severing the line. Further the spool itself is mounted on a disengageable chuck so that the spool may be readily removed from the reel and a new spool substituted when desired.

It is accordingly an object of the invention to provide an improved trotline reel.

It is a further object of the invention to provide a trotline reel in which the spools may be readily removed.

It is a further object of the invention to provide a means of applying a brake to the spool in a trotline reel.

It is a further object of the invention to provide a trotline reel which may be readily adjusted into any desired position.

Other objects and many of the attendant advantages of the present invention will be apparent from the following detailed description taken in conjunction with the accompanying drawing, in which:

Figure 2 is a cross-sectional view of the trotline reel taken substantially on the plane indicated by the line 2—2 of Figure 1 and showing the construction of the detachable mount and driving connection;

Figure 3 is a fractional enlarged view of the detachable connection and showing the details thereof;

Figure 4 is a vertical section through the articulation of the reel stand taken substantially on the plane indicated by the line 4—4 of Figure 1;

Figure 5 is a perspective view of the line guide or bridle showing the labyrinth type opening so that the line may be disengaged therefrom.

Figures 1, 6:
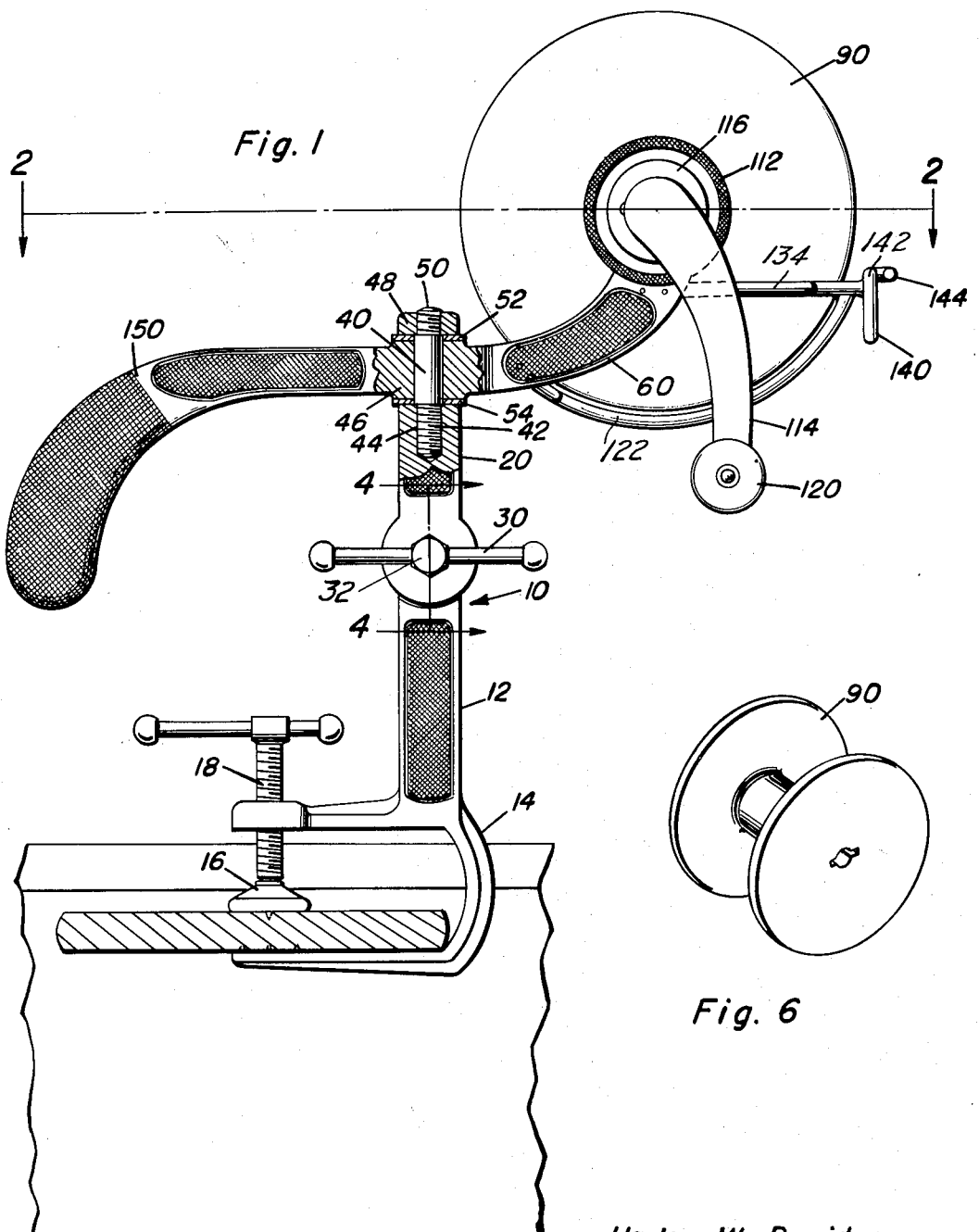
Figure 1 is a side elevation of the trotline reel in operative position on a portion of the boat.
Figure 6 is a perspective view of a detachable spool to be utilized in the trotline reel.

In the exemplification according to the invention a stand member indicated generally at 10 has a bottom stand portion 12 to which a suitable connector such as a clamp 14 may be applied preferably as an integral portion thereof so that a clamp jaw 16 supported by a clamp screw 18 may be utilized to clamp the stand member 12 in firm relation on any portion of a boat or other support. A top portion 20 is articulated with respect to the portion 12 by having a substantially flat ear portion 22 which is engageable with a substantially flat portion 24 of the lower portion 12 and having radial teeth 26 engageable therebetween and a screw 28 threadedly engageable with the ear 22 and operated by means of the crank arm 30 which extends through the bolt head 32 and preferably is provided with a suitable compression washer 34. The threaded end of the bolt 28 is provided with a stop nut 36 which is secured thereon by means of a suitable pin 38. A pivot pin 40 is secured in the top of the member 20 by means of a threaded end 42 engaged in a threaded socket 44 in the top of the stand member. A fork member 46 is pivotally mounted on the pin 40 and secured thereon by means of a nut 48 which will be retained in position by means of a suitable pin 50. Bearing washers 52 and 54 are placed on opposite sides of the fork member 46.

The fork member 46 is provided with fork arms 58 and 60. The arms 58 and 60 extending in substantially parallel spaced relation from the fork member 46.

The fork arm 58 is provided with a tubular sleeve member 62 having a portion of the external end thereof provided with internal threads 64. A bearing cylinder 66 is provided with an externally knurled nut 68 and is also provided adjacent each end thereof with external threads 70 and 72 for engagement with the internal threads 64 of the sleeve 62. The portion 74 between the threads 70 and 72 is of reduced diameter so that it will readily pass through the internal threaded portion 64. A bearing spindle 76 extends through the center of the bearing cylinder 66 and is provided with a head 78 which will readily slide in the sleeve 62 but will not pass through the internal threaded portion 64. A lock nut 80 is provided on the end of the spindle 76 and secured thereto by a suitable lock pin 82. A spool chuck 84 extends outwardly from the head 78 and is provided with a cross-pin 86 so that the chuck 84 will be non-rotatably received in a suitable recess or socket 88 in a spool 90.

The fork arm 60 is provided with a bearing sleeve 92 through which extends a driving spindle 94. The inner end of the spindle 94 being provided with a chuck member 96 for engagement with a recess in the end of the spool 90 which is incapable of passing through the bearing sleeve 92. A brake disk 98 mounted in a brake recess 100 on the inner end of the bearing sleeve 92 is provided with a portion 102 in pressure contact with the extended chuck member 96.

A second brake disk 104 is mounted on a bearing surface 106 at the opposite end of the sleeve 92 and a brake follower 108 is slidably but non-rotatably mounted on the driving spindle 94 by means of a key 110. An adjusting nut 112 is threadedly mounted on the spindle 94 and may be adjusted to compress the brake plates 98 and 104 as may be desired. The crank 114 is provided with a head 116 which is threaded on the end of the spindle 94 and secured in place by means of a suitable pin 118. The usual crank knob 120 is provided adjacent the end of the crank arm 114.

The line guide or bridle is preferably utilized to properly guide the trotline onto the spool 90 and for this purpose fork members 122 and 124 are provided with offset end portions 126 and 128 which are riveted or otherwise permanently secured to the fork members adjacent the base thereof. Intermediate portions 122 and 124 are preferably curved to closely fit adjacent the rim of the spool 90 at each end thereof and are offset by means of the portions 130 and 132. Brace arms 134 and 136 are connected adjacent the outer ends of the legs 122 and 124 and are rigidly connected adjacent the outer ends of the fork members 58 and 60 so that the bridle is rigidly supported adjacent to the periphery of the spool 90. A substantially rectangular loop 140 is mounted on the ends of the arms 122 and 124 and has a substantially solid bottom portion but a top portion provided by means of a pair of parallel extending arms 142 and 144 which provide a substantially labyrinth like joint between the members 142 and 144 and thus provide a top member for the bridle. Preferably the members 142 and 144 are somewhat resilient and spaced from each other a distance such that the line will only pass therethrough when one of the members has been slightly sprung. A control handle 150 is mounted preferably integral with the fork member 46 so that the orientation of the reel may be readily controlled.

In the construction of the reel device the cylinder 66 is screwed into the sleeve 62 after which the spindle 76 is extended through the bearing cylinder 66 and secured in place by the nut 80 which will again be secured by means of the pin 82 so that the device is capable of being operated without thereafter removing the pin 82 and the nut 80.

In the assembly of the driving shaft the brake disks 98 will be placed on the spindle 94 in compression relation with the chuck 96 after which the spindle 94 will be extended through the bearing sleeve 92 after which the brake disk 104 will be placed on the seat 106 and a follower 108 will be keyed to the spindle 94 by means of the key 110 after which the compression nut 112 will be screwed in place. Crank arm 114 is rigidly secured to the driven spindle 94 by means of screwing the head 116 into place after which it is rigidly secured by means of the pin 118 to provide a driving spindle which may be disassembled only by removing the pin 118 and unscrewing the cap 116 and the nut 112.

In operation of the device a suitable spool 90 will be secured between the chucks 86 and 96 and nut 112 will be adjusted to provide the desired tension in the line after which the line will be inserted through the bridle 140 and the end of the line fixed to any suitable object. The boat will then be propelled across the body of water so that the brake will maintain the tension in the line while the line will be readily payed out to the bridle. When as is usually the case the line on the reel 90 is longer than the extent of the water in which it is laid the unpayed out portion of the line will be secured to the spool by means of a couple of half hitches taken around the spool after which the spool may be disengaged and left in position with any suitable anchoring device while a new spool may be installed in the reel for setting another line.

On picking up the line a partially empty spool will be loosened by removing the half hitches around the spool and the spool inserted in the reel after which the operator will turn the crank 114 to wind the trotline onto the spool and produce a level winding motion of the trotline by means of the control handle 150 which will cause desired angulation of the spool so that the adjacent turns of the line being wound will be adjacent to each other and consequently travels back and forth across the spool 90. The entire reel structure is of sufficient strength and rigidity that the boat may be propelled thereby so that the tension of the line will cause the forward motion of the boat and thus maintain a tight line at all times during the rewinding operation.

For purposes of exemplification a particular embodiment of the device has been shown and illustrated and described according to the best present understanding thereof. However, it will be apparent to those skilled in the art that various changes and modifications and the construction and arrangement of parts thereof may be readily made without departing from the spirit and purpose of the invention.

What is claimed as new is as follows:

1. A trotline reel comprising an articulated stand, a securing means on said stand, a fork member journaled on said stand, a control handle on said fork member, said fork member including a pair of fork arms, a tubular sleeve on one of said fork arms, said sleeve being internally threaded adjacent the outer end thereof, a bearing cylinder, said bearing cylinder being externally threaded adjacent each end and having a reduced central portion, a spindle journaled in said cylinder, a head on said spindle, said head being incapable of passing through said internal threads, a spool engaging chuck on said spindle, a bearing sleeve on the other of said fork arms, a driving spindle journaled in said bearing sleeve, a spool engaging chuck on said driving spindle, and a crank secured on said driving spindle.

2. A trotline reel comprising an articulated stand, a securing means on said stand, a fork member journaled on said stand, a control handle on said fork member, said fork member including a pair of fork arms, a tubular sleeve on one of said fork arms, said sleeve being internally threaded adjacent the outer end thereof, a bearing cylinder, said bearing cylinder being externally threaded adjacent each end and having a reduced central portion, a spindle journaled in said cylinder, a head on said spindle, said head being incapable of passing through said internal threads, a spool engaging chuck on said spindle, a bearing sleeve on the other of said fork arms, a driving spindle journaled in said bearing sleeve, a spool engaging chuck on said driving spindle, a crank secured on said driving spindle, and an adjustable brake on said driving spindle.

3. A trotline reel comprising an articulated stand, a securing means on said stand, a fork member journaled on said stand, a control handle on said fork member, said fork member including a pair of fork arms, a tubular sleeve on one of said fork arms, said sleeve being internally threaded adjacent the outer end thereof, a bearing cylinder, said bearing cylinder being externally threaded adjacent each end and having a reduced central portion, a spindle journaled in said cylinder, a head on said spindle, said head being incapable of passing through said internal threads, a spool engaging chuck on said spindle, a bearing sleeve on the other of said fork arms, a driving spindle journaled in said bearing sleeve, a spool engaging chuck on said driving spindle, a crank secured on said driving spindle, a brake disk at each end of said bearing sleeve, a compression contact between said spool chuck and one of said brake disks, a follower disk slidably but non-rotatably secured on said spindle and contacting the other of said brake disk, and an adjusting nut on said spindle.

References Cited in the file of this patent

UNITED STATES PATENTS

| | | | |
|---|---|---|---|
| 610,880 | Perkins | Sept. 13, | 1898 |
| 687,942 | Sanders | Dec. 3, | 1901 |
| 964,116 | Moser | July 12, | 1910 |
| 1,408,908 | Roth | Mar. 7, | 1922 |
| 1,649,224 | Griffin | Nov. 15, | 1927 |
| 1,974,485 | Doherty | Sept. 25, | 1934 |
| 2,693,660 | Nebergall et al. | Nov. 9, | 1954 |